United States Patent

[11] 3,632,892

[72] Inventors Richard T. McLaughlin
764 N. 26th St.;
Frederick G. Talbot, 4424 N. 26th St., both of Philadelphia, Pa. 19130; Lawrence E. Kurtzo, Jr., 837 Concord Place, Lansdale, Pa. 19446; Frederick T. Moulton, 1844 Willow Ave., Willow Grove, Pa. 19096

[21] Appl. No. 860,606
[22] Filed Sept. 24, 1969
[45] Patented Jan. 4, 1972

[54] EXTERNAL ILLUMINATING DEVICE FOR KEY TELEPHONES
7 Claims, 3 Drawing Figs.

[52] U.S. Cl. .......... 179/81 C, 179/179
[51] Int. Cl. .......... H04m 1/00
[50] Field of Search .......... 179/81 C, 84 L, 90 K, 100 D, 179

[56] References Cited

UNITED STATES PATENTS

| | | | |
|---|---|---|---|
| 2,516,676 | 7/1950 | Caroselli .......... | 179/81 C |
| 2,572,814 | 10/1951 | Laporte .......... | 179/179 |

*Primary Examiner*—Kathleen H. Claffy
*Assistant Examiner*—William A. Hellvestine
*Attorney*—Stephen J. Bor

ABSTRACT: A visual signalling and control system for nonilluminated pushbutton telephones which is electrically independent of the existing telephone. The system employs an electronic logic signal-control center and station apparatus which duplicates the illuminated signalling functions of a self-contained illuminated pushbutton telephone.

INVENTOR.
FREDERICK G. TALBOT- RICHARD T. McLAUGHLIN
LAWRENCE E. KURTZO, JR-FREDRICK T. MOULTON
BY
Stephen J. Bor
AGENT INVENTOR
FREDERICK G. TALBOT - RICHARD T. McLAUGHLIN
LAWRENCE E. KURTZO, JR - FREDRICK T. MOULTON
BY
Stephen J Bor
AGENT

EXTERNAL ILLUMINATING DEVICE FOR KEY TELEPHONES

The present invention relates to a telephone signalling system and more particularly to a control system which provides the illumination feature for a nonilluminated key telephone by monitoring and indicating the incoming trunk line signals and providing busy lamp indications therefore.

Presently, in the telephone service field, it has been the general practice of the companies supplying commercial telephones or in supplying phones to home owners requesting more than one telephone number, to provide key telephones, usually having a row of six pushbuttons adjacent and parallel to the forward edge of each phone. A monthly rental fee is charged by the installing company for the use of the phone and an additional charge is made for the use of the lights supplied under each of the transparent pushbuttons which, of course, is a visual indication that a particular line is in use or that an incoming call is present on that line.

Generally, telephone companies have a strict policy which precludes any direct electrical connections to telephones or telephone lines or equipment which they install, but devices which are attached by friction are permitted. This of course is economically unsatisfactory to the telephone subscriber in that heretofore if someone had a key telephone installed he had to pay two rental charges, if the illumination feature was desired as he could not electrically connect external signals to the wiring of the telephone.

It is, therefore, an object of the present invention to provide a novel and improved signalling device for key telephones.

It is a further object of the present invention to provide a novel and improved visual indicating device which replaces the existing indicators provided on key telephones and performs the same function therefore.

It is another object of the present invention to provide a novel and improved illuminating device for key telephones which is external, electrically independent of and more economical than conventional telephone signalling systems.

A still further object of the present invention is to provide a novel and improved signal-control system for nonilluminated pushbutton telephones which is relatively simple in construction and yet highly accurate and reliable in use.

Figure 2:
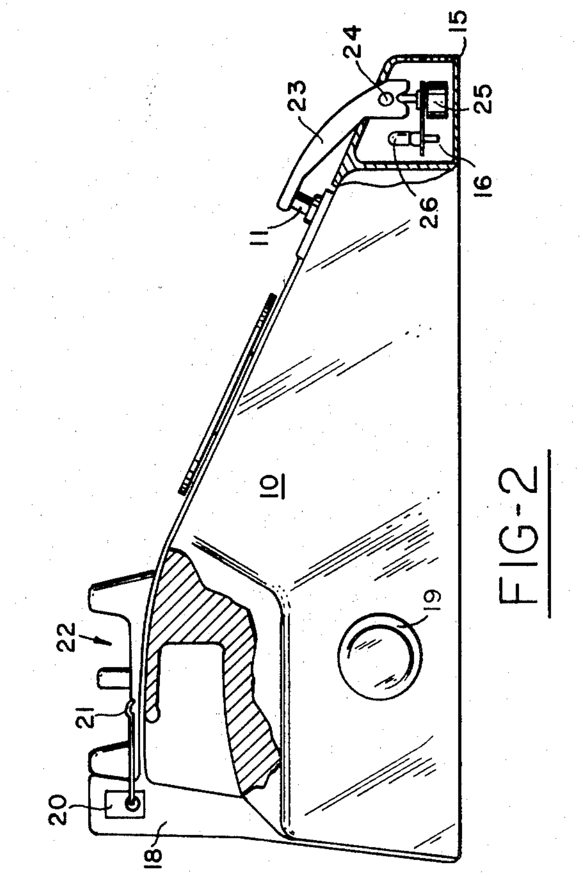
Figure 1:
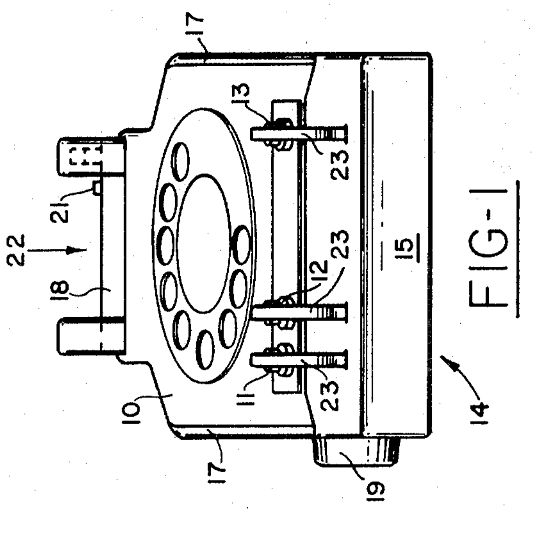
Figure 3:
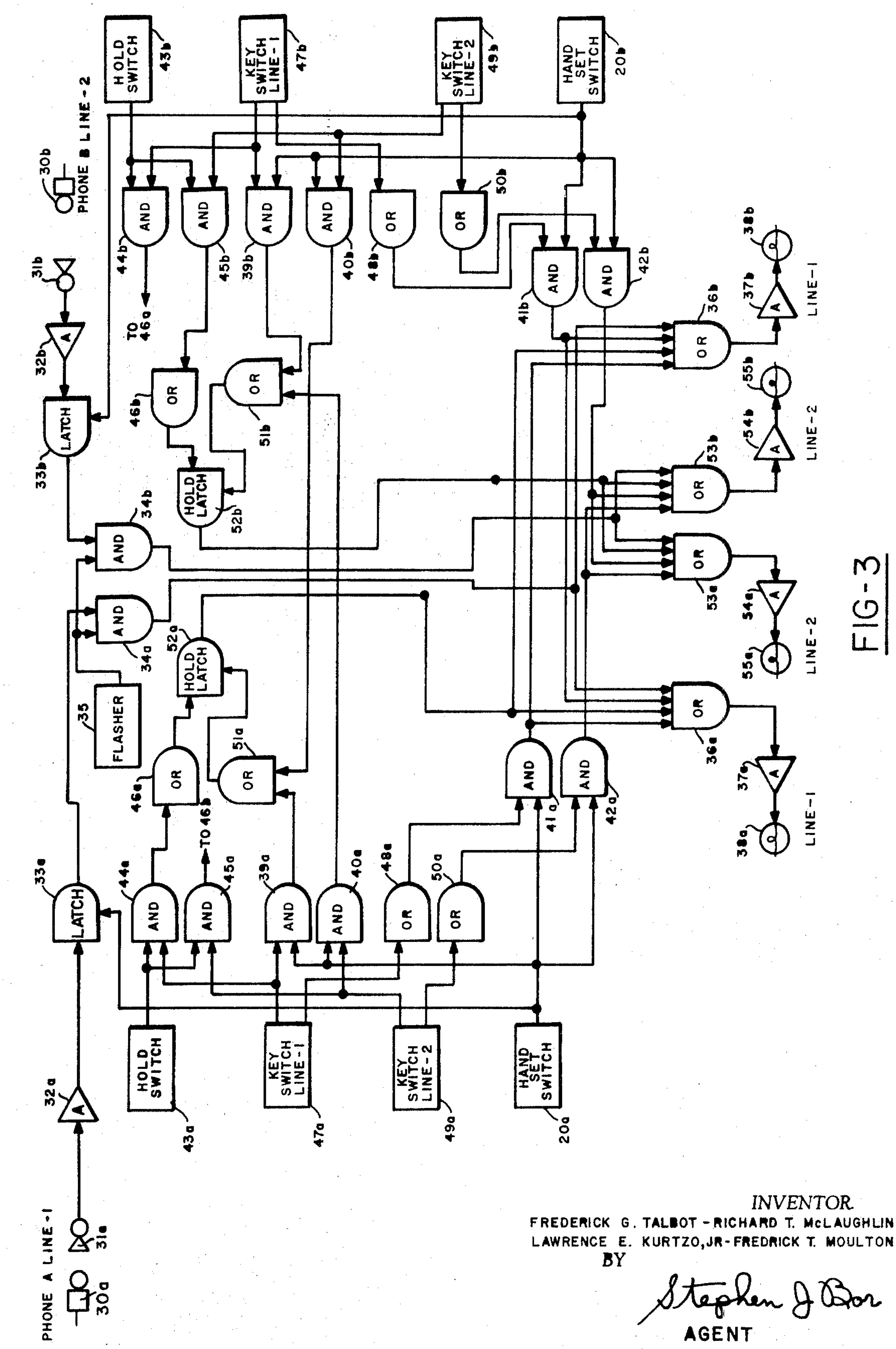

Other objects, advantages and novel features of the invention will become apparent from the following detailed description of the invention when considered in conjunction with the accompanying drawings wherein:

FIG. 1 of the drawing is a front view of a key telephone and the attached external indicating and control device according to a preferred form of the present invention;

FIG. 2 of the drawings is a side elevational view, partly in section, of the same; and FIG. 3 of the drawings is a schematic block diagram showing a preferred embodiment of apparatus for carrying out the signalling function of the present invention.

Referring now to the details of the drawings wherein like reference numerals apply to like parts throughout, and more particularly to FIGS. 1 and 2, a standard conventional nonilluminated key telephone instrument 10 is shown having three active pushbuttons 11–13, respectively. It is to be noted that the inventive apparatus is not meant to be limited for use with three active pushbuttons of a six button telephone, which is only shown for purposes of simplicity, but may be utilized on a telephone having any number of line buttons, which will become more apparent hereinafter.

The inventive apparatus has a main body section indicated in general at 14, having a front wall 15 which is extended a distance past the front edge of the telephone 10 so as to provide cover or housing 16 for all or a portion of the logic circuitry shown in FIG. 3. Sidewall sections 17 are also provided which are parallel to each other and at right angles to the front wall 15 and which extend back to a rear wall section 18. The body 15 generally follows the contour of the standard key telephone 10 and substantially takes the same shape thereof so that it may be easily and conveniently clamped on to said telephone when it is desired to be used or as easily disengaged therefrom. The body 15 is preferably constructed of a thin plastic material or any other suitable material having similar properties of strength, lightness and low price may be used.

A circular sensor cavity 19 is provided to project from one of the sidewalls 17 which is nearest to the placement of the ringing bell of the telephone 10 (not shown) and is provided to enclose an electromagnetic or acoustical sensor element whose operation will become more apparent hereinafter. In the rear wall portion 18 there is a spring-biased handset switch 20 having an arm member 21 connected therewith which extends into the cradle area 22 of the telephone 10, mating with and being depressed by the telephone handset or receiver (not shown) when it is placed in the cradle.

Located in and extending from the housing 16 are finger actuator elements 23, one for each of the pushbuttons 11–13 provided on the telephone 10. The fingers 23 are pivoted as shown at 24, so as to be freely movable in a vertical plane and each are positioned to overlap a complimentory button at their top edge. A switch 25 is engaged by the bottom edge of each of the fingers 23, and is actuated, either on or off, by movement thereof. A lamp 26 is mounted in the housing 16 adjacent the bottom edge of each of the fingers 23. The fingers 23 are preferably made of a clear plastic or other similar transparent material so that when an associated lamp 26 is lit, it will shine through the finger 23 and act as a visual signal to anyone viewing it.

Referring now in detail to the logic signal-control circuit of FIG. 3, a two-telephone system with two telephone trunk lines and a hold circuit on each instrument is shown. It is to be noted that a two telephone, two line system is shown merely for reasons of simplicity and any number of lines and telephones may be provided for simply by adding additional circuitry similar to that shown, and hereinafter described, for each telephone. The circuitry associated with each telephone is substantially identical and only the circuitry of telephone A will be described in detail.

The circuitry associated with telephone A comprises a bell **30*a* which is the normal ringing device enclosed in the telephone instrument 10 and which rings to signal an incoming call on line 1 only. A sensor or pickup 31*a* is enclosed in the sensor cavity 19 and is preferably an electromagnetic coil, but which may be any suitable conventional acoustical mechanical device well known to the art, which generates a signal to an amplifier 32*a* whenever the bell 30*a* rings. The output from amplifier 32*a* is connected to a latch 33*a* which is of conventional logic design and may comprise a pair of cross-coupled NAND gates for example, the output from the amplifier serving a set signal therefore. The output from the latch 33*a* is then fed to one input of an AND-gate 34*a* along with the output from a flasher 35 which is fed to the other input of the AND-gate 34*a*. The flasher 35 may be a conventional square wave generator, adjustable to provide any preferred frequency of flashing light signals to indicate an incoming call, which will become more apparent hereinafter. The output from the AND-gate 34*a* is connected to one input of an OR-gate 36*a* whose output is amplified in an amplifier 37*a* to light a lamp 38*a***.

Normally open handset switch **20*a*, which is activated or extended when the telephone handset is removed from the cradle of the telephone 10, has its output connected to supply a reset signal to the latch 33*a* and is also connected to one input of the AND-gates 39*a* and 40*a*, respectively. A hold switch 43*a* has its output connected to one input of the AND-gates 44*a* and 45*a*, respectively, whose output signals are then fed to the input of the OR-gate 46*a* and, its counterpart for telephone B the OR-gate 46*b*, respectively. Similarly, the output signal from the AND-gate 44*b* is cross-coupled to the OR-gate 46*a***, for the purpose which will become more apparent hereinafter.

A key switch **47*a*, which is associated with incoming and outgoing calls on line 1, has its output connected to the second input of AND-gate 44*a*, the second input of AND-gate 39*a* and to the signal input of an OR-gate 48*a* which has its output fed to the second input of the AND-gate 41***a*. A second key switch 49*a*, which is associated with incoming and outgoing calls on line 2, has its output connected to the second input of AND-gate 45*a*, the second input of AND-gate 40*a* and to the input of an OR-gate 50*a* which has its output fed to the second input of the AND-gate 42*a*.

The output signal from the AND-gate 39*a* is connected to an input of OR-gate 51*a*, the other input signal or the OR-gate 51*a* being derived from the AND-gate 40*b*, which is part of the circuitry associated with line 1 on telephone B. The outputs from the OR-gates 46*a* and 51*a* provide a set and reset signal to a hold latch 52*a* for line 1, which is preferably similar in construction the latch 33*a*, whose output signal is connected to an input of the OR-gate 36*a*. The OR-gate 36*a*, in addition, receives an input from the AND-gates 41*a* and 41*b*, whose operation will become more apparent hereinafter. An OR-gate 53*a*, also having four input terminals, has its output signal amplified by amplifier 54*a* in order to light a lamp 55*a*. Input signals to the OR-gate 53*a* are provided by the AND-gates, 42*a*, 42*b* and 34*b* and by the hold latch 52*b* which performs the hold function for line 2.

The circuit of telephone B is substantially identical to the circuit of telephone A, as stated earlier, with the reference characters in the drawing being the same for corresponding parts except for the substitution of the letter *b* for *a*. It is to be noted that the switches 43, 47 and 49 and the AND and OR gates employed may be of any suitable conventional type of electrical and electromechanical means for performing the necessary and desired functions required for operation.

The signal-control circuitry is preferably enclosed in a separate centrally located housing especially provided therefore, but it is to be understood that the circuitry associated with each respective telephone may be enclosed in the housing 16 using well known contemporary circuit miniaturization techniques.

This signal-control circuit for a two-telephone system operates in the following manner. Assume that both telephones A and B have their receivers or handsets in their respective cradles, and a call comes in on line 1 which will ring the bell 30*a* located at telephone A. The sensor 31*a* receives the acoustical or electromagnetic energy from the ringing bell 30*a*, whereupon the signal is amplified in the amplifier 32. The signal sets the latch 33*a* which, along with the flasher 35, causes a signal to be emitted from the AND-gate 34*a*. This signal energizes the OR-gates 36*a* and 36*b* which illuminates the lamps 38*a* and 38*b*, associated with the key switches 47*a* and 47*b* on telephones A and B, respectively, indicating a call is incoming on line 1. The lamps 38*a* and 38*b* are blinking at the frequency at which the flasher 35 is selected to operate since the output signal from the AND-gate 34*a* is dependent on a signal received from the flasher. Following similar reasoning, a call on line 2 on telephone B would illuminate and cause the lamps 55*a* and 55*b* to blink, indicating an incoming call at each telephone, since the same logic circuitry is implemented for both telephone instruments.

The circuit is now prepared for the next operation. One of the following two operations may now take place; (1) the operator at either telephone may answer the incoming call on line 1 or (2) the operator at either telephone may ignore the signal and place an outgoing call on line 2.

The first operation is initiated by the operator at either telephone by picking up the receiver and pushing the actuator finger associated with the key switch for line 1. If, for example, the key switch 47*a* of telephone A is activated after picking up the receiver and extending the handset switch 20*a*, a reset signal is fed to the latch 33*a* which, in addition to the lack of a set signal from the amplifier 32*a*, removes the input signal to the AND-gate 34*a* so that the flashing signal is removed from OR-gate 36*a* and 36*b*. To maintain the indication of a received call, a signal passed by the handset switch 20*a* is received by one of the inputs to AND-gate 41*a* and a signal passed by the key switch 47*a* is fed to the OR-gate 48*a* which issues a signal to the second input of the AND-gate 41*a* causing the lamps 38*a* and 38*b* to stay lit through signals derived from the outputs of the OR-gates 36*a* and 36*b*, respectively.

The next possible operation for the operator at telephone A consists of ignoring the flashing signal on line 1, and instead of answering the incoming call, the operator may pick up the receiver after pushing the actuator finger associated with the key switch 49*a* of line 2. Although a reset signal is received by the latch 33*a* to shut off the flashing lamps when the handset switch 20*a* is extended, the lamps 38*a* and 38*b* will continue to flash due to the fact that the bell 30*a* to signal an incoming call on line 1, continues to ring thereby resetting the latch 33*a* which in turn causes the lamps to continue to flash. The lamps 55*a* and 55*b*, indicating that line 2 is in use, are now on steady. This condition exists because a signal derived from the handset switch 20*a* is received by one of the inputs to the AND-gate 42*a* and a signal derived from the key switch 47*a* is fed to the OR-gate 50*a* which issues a signal to the second input of the AND-gate 42*a* thereby sending a signal to the OR-gates 53*a* and 53*b*, respectively, causing the lamps 55*a* and 55*b* to stay lit.

The operation of the hold switch 43*a* will now be described. The function of the hold switches is to maintain an indication of a received call on either line, which line or lines are removed from active conversation or participation by pressing the finger actuator associated with the hold switch on the telephone instrument being used. The hold line or call can be returned to active participation by pressing the appropriate finger actuator when the call is to be resumed.

For example, assume it is desired to hold a call on line 1. The handset switch 20*a* is extended, the key switch 47*a* is activated and the hold switch 43*a* is then depressed which sends a signal to one of the inputs of the AND-gate 44*a*. A signal passed by the key switch 47*a* is fed to the second input of the AND-gate 44*a* prior to the key switch being inactivated by the action of depressing the finger actuator associated with the hold switch 43*a*. The output from the AND-gate 44*a* activates the OR-gate 46*a* which emits a set signal to the latch 52*a* thereby causing the lamps 38*a* and 38*b* to stay lit indicating a held call. Conversation on the held line is resumed by pressing the finger actuator associated with the key switch 47*a* (line 1) which sends a signal to one of the inputs of the AND-gate 39*a* which also receives an input from the handset switch 20*a*. The AND-gate 39*a* emits a reset signal which is coupled through the OR-gate 51*a* to the hold latch 52*a* thereby releasing said latch and discontinuing its output signal. If, for example, a call is being held on line 2, the hold latch 52*b* is reset by the action of the operator at telephone A depressing the finger actuator associated with key switch 49*a* which sends a signal to one input of the AND-gate 40*a* which also receives an input signal from the hand set switch 20*a*. The output passed by the AND-gate 40*a* is connected through the OR-gate 51*b* to reset the hold latch 52*b*. If necessary, both lines 1 and 2 may be held at the same time, and either one or both of the handsets may be placed in their respective cradle without affecting the held calls.

It can, therefore, be seen that a relatively simple and inexpensive indicator circuit has been provided wherein all the signaling functions included in the present key telephone instruments have been duplicated utilizing none of the circuitry supplied in said key telephones nor with any electrical connections made thereto. It is to be noted that the identical circuit operation would apply to operation of telephone B, and the results achieved would be the same if the functions described above were to be initiated by an operator at telephone B.

Obviously many modifications and variations of the present invention are possible in the light of the above teachings. For example, while the invention has been described with reference to the circuit disclosed herein, it is not confined to the details set forth since it is apparent that certain electrical equivalent components may be substituted for the components of the preferred circuit without departing from the scope of the invention. Thus, the flasher 35 and the various gates may be replaced with other combinations of logic components to provide substantially the same logic functions obtained by those shown in FIG. 3.

It is, therefore, to be understood that, within the scope of the appended claims, the invention may be practiced otherwise than as specifically described.

What is claimed is:

1. A key telephone visual signaling and control system providing the illuminating features for a nonilluminated key telephone having a multiplicity of telephone lines and a hold means, without maintaining any electrical connections thereto, comprising, in combination:

a. a main body section substantially mating with and following the contour of the key telephone having housing means positioned adjacent the front edge and pushbuttons of said key telephone, and a pair of parallel sidewall sections extending from said front edge into a rear wall section, said telephone demountably engaged in said main body section;

b. a generally circular sensor cavity formed integrally with one of said sidewall sections and projecting a distance therefrom, said sensor cavity placed in juxtaposition with the ringing bell of the key telephone;

c. a normally open handset switch enclosed in said backwall section having an arm member extending into the cradle area of the key telephone so that said arm member contacts the telephone hand set when it is placed in said cradle, thereby maintaining the open condition of said switch until the handset is removed;

d. a plurality of transparent finger actuator elements pivotally connected with the housing means, each of said elements extending through openings provided in said housing means to overlap a complimentary pushbutton provided on the key telephone, each of said finger actuator elements being in intimate contact with said complimentary pushbuttons and positioned to move in the same plane thereas;

e. a plurality of normally open switches mounted within the housing means, each of said switches being in intimate contact with the bottom edge of one of the finger actuator elements so that said switches are closed when the finger actuator element associated therewith is depressed;

f. a multiplicity of signal lamps mounted within the housing means, each of said lamps indicating one of the telephone lines of the key telephone and positioned adjacent the bottom edge of one of the finger actuator elements so that the light from said lamps will be transmitted through said elements;

g. and a logic signal-control circuit coupled to the multiplicity of signal lamps and having a first means for generating a line-lamp signal, a second means for generating a busy-lamp signal and a third means for generating a hold-lamp signal.

2. A key telephone signaling and control system substantially as described in claim 1, wherein said first means includes:

a. an energy sensor mounted in the sensor cavity and responsive to the ringing bell of the telephone for generating a call signal;

b. an AND gate having a first and second input means and an output;

c. latch means coupled between the sensor and the first input of the AND gate, for providing a constant signal thereto in response to a call signal from said sensor;

d. flasher means coupled to the second input of the AND gate for generating a variable oscillating signal thereto;

e. and an OR gate having a plurality of input means coupled between the output of the AND gate and one of the multiplicity of signal lamps to supply an oscillating signal thereto, thereby causing said lamp to light at the frequency of said flasher means indicating an incoming call on the telephone line associated with the ringing bell.

3. A key telephone signaling and control system substantially as described in claim 2, wherein said second means includes:

a. an OR gate having an input means an output, the input coupled to one of said plurality of switches, said switch generating an output signal when the finger actuator element associated therewith is depressed;

b. an AND gate having a first and second input means and an output coupled between the output from said last mentioned OR gate and one of the inputs of the OR gate from said first means;

c. and wherein a signal passed by the handset switch when the handset is removed from the cradle is coupled to the latch means, thereby resetting said latch and discontinuing the output signal therefrom, and also coupled to the second input of said last mentioned AND gate, thereby providing a constant input signal to said one lamp causing said one lamp to light indicating that the telephone line associated with the ringing bell is in use.

4. A key telephone signaling and control system substantially as described in claim 3, wherein said third means includes:

a. a first and a second AND gate each having a first and second input means and an output;

b. a first and a second OR gate each having at least one input means and an output;

c. hold latch means coupled between the first OR gate and one of the inputs of the OR gate of said first means;

d. and wherein the first AND gate is responsive to inputs from the signals passed by closing the switch associated wh the hold pushbutton on the key telephone and by reclosing said one of said plurality of switches which is opened when the hold switch is closed, said second AND gate responsive to inputs from the signals passed by reclosing said one of said plurality of switches and by closing said handset switch, the output signal from said first AND gate coupled to the input of said first OR gate to supply a set signal to said hold latch, and the output signal from said second AND gate coupled to the input of said second OR gate to supply a reset signal to said hold latch.

5. A key telephone signaling and control system substantially as described in claim 4, wherein:

a. the OR gate of said first means is responsive to a constant input signal from any other complimentary key telephones associated with said key telephone when an operator at said other telephone places the telephone line associated with said ringing bell into use, thereby indicating a busy condition by lighting said one lamp;

b. and wherein the first OR gate of said third means is responsive to an input signal from a complimentary key telephone when an operator at said other telephone places the telephone line associated with said ringing bell on hold and the second OR gate of said third means is responsive to an input signal from a complimentary key telephone when an operator at said other telephone resumes a held call on the line associated with said ringing bell.

6. A key telephone signaling and control system substantially as described in claim 5, wherein for each telephone line associated with the key telephone, the logic signal control circuit also includes:

a. a third AND gate having a pair of input means responsive to an input signal from the switch associated with the hold pushbutton on the key telephone and from one of said other line switches, respectively, the output from said third AND gate supplying a set signal to said complimentary key telephones so that a hold condition is indicated on one of said other lines;

b. a fourth AND gate having a pair of input means responsive to an input signal from the handset switch and from said one of said other line switches, respectively, the output from said fourth AND gate supplying a reset signal to said complimentary key telephones when a held call is resumed;

c. and a third and fourth OR gate, said third OR gate responsive to an input signal from said one of said other line switches, and AND gate having a pair of input means and an output coupled between said third and fourth OR gates, said AND gate also responsive to an input signal from the hand set switch, and the output from said fourth OR gate coupled to one of said other line lamps, said fourth OR gate also responsive to input signals from said complimentary key telephones for receiving line-lamp, busy-lamp and hold-lamp signals.

7. Apparatus for providing the signaling and illuminating features to a nonilluminated key telephone, comprising, in combination:

a. a main body section demountably engaged on the body of the key telephone and substantially following the contour of the front, sidewalls and backwalls thereof;

b. housing means formed in the main body section adjacent the pushbuttons of the key telephones;

c. a sensor cavity formed in the main body section adjacent the placement of the ringing bell in the key telephone;

d. a handset switch positioned adjacent the cradle area of the key telephone which is activated when the key telephone receiver is picked up;

e. a complementary transparent actuator member overlapping and in intimate contact with each of the pushbuttons provided on the key telephone, said actuator members pivotally connected within said housing means to move with and in the same direction as said pushbuttons;

f. and logic signal-control means including a switch for each of the actuator members operatively connected thereto, a signal lamp for each of the telephone lines, associated with the key telephone, each of said lamps mounted in the housing means adjacent an actuator member associated with the same telephone line, and means coupled between the switches and the signal lamps for producing a line-lamp, busy-lamp and hold-lamp signals for each of the telephone lines.

* * * * *